UNITED STATES PATENT OFFICE.

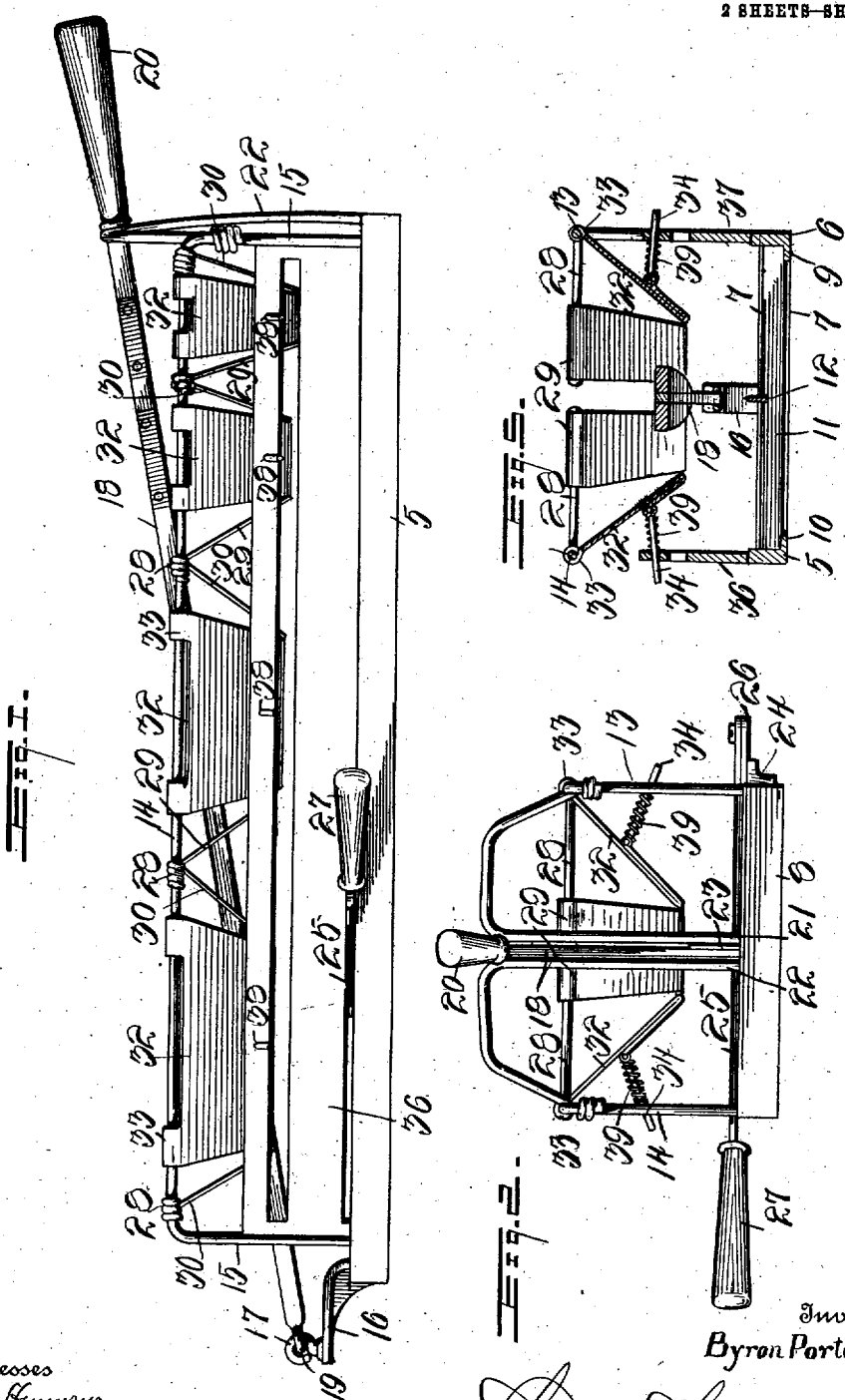

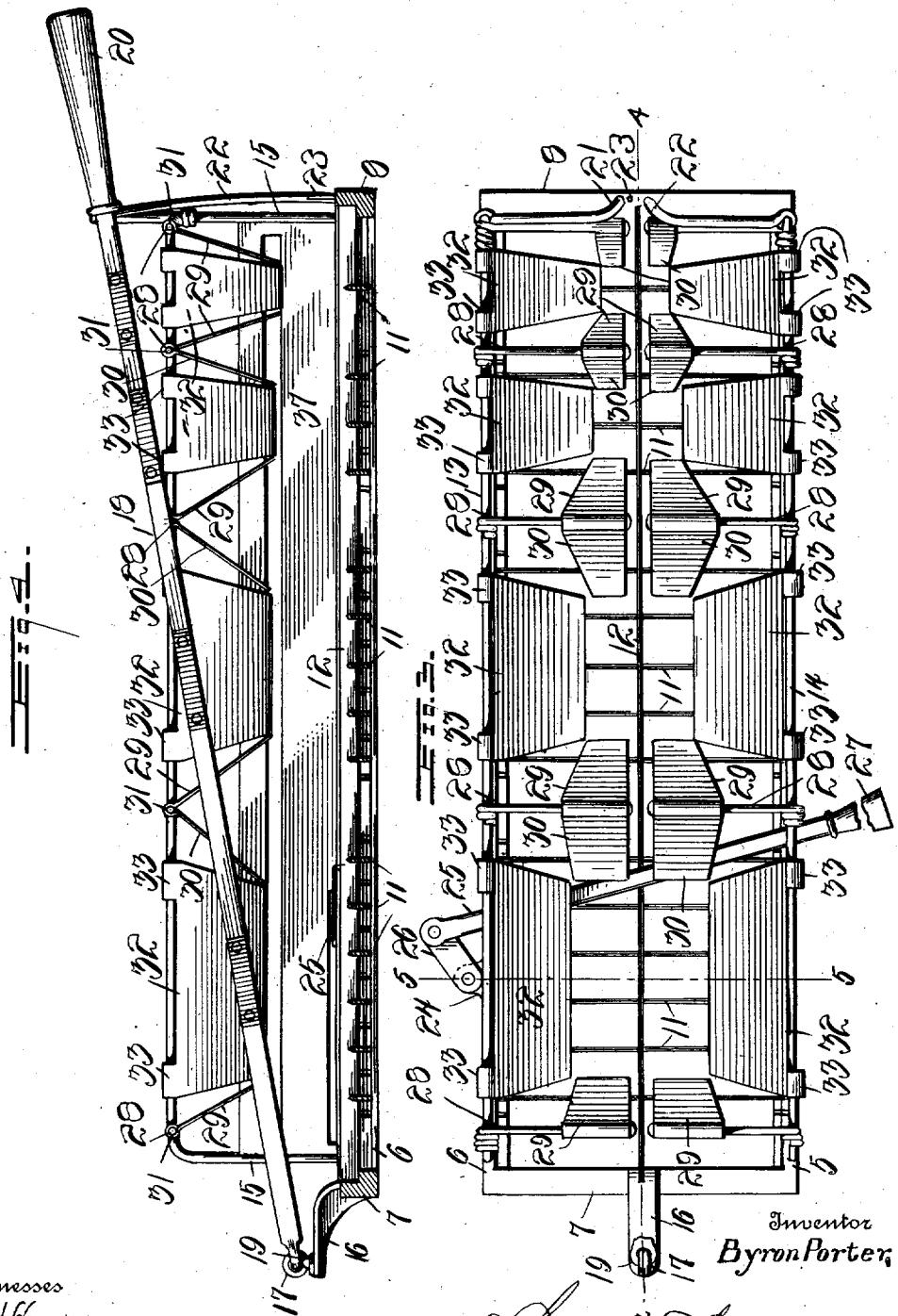

BYRON PORTER, OF MORGAN, UTAH.

SEED-POTATO CUTTER.

972,911.  Specification of Letters Patent.  Patented Oct. 18, 1910.

Application filed October 26, 1909. Serial No. 524,692.

*To all whom it may concern:*

Be it known that I, BYRON PORTER, a citizen of the United States, residing at Morgan, in the county of Morgan, State of Utah, have invented certain new and useful Improvements in Seed-Potato Cutters; and I do hereby declare the following to be a full, clear, and exact description of the invention, such as will enable others skilled in the art to which it appertains to make and use the same.

This invention relates to improvements in vegetable cutters and more particularly to the type known as seed potato cutters.

It has for its object the provision of a device of that kind provided with a means for firmly holding potatoes of various sizes in position to be cut.

Another object is the provision of a longitudinally movable cutter constructed to halve potatoes of relatively large dimensions.

With these and other objects in view as will more fully hereinafter appear, the present invention consists in certain novel details of construction and arrangement of parts, hereinafter fully described, illustrated in the accompanying drawings and more particularly pointed out in the appended claims.

In the accompanying drawings forming part of the specification:—Figure 1 is a side elevation of the device. Fig. 2 is an end view thereof. Fig. 3 is a plan view. Fig. 4 is a longitudinal section on the line 4—4 of Fig. 3. Fig. 5 is a sectional end elevation on the line 5—5 of Fig. 3.

Similar numerals of reference are employed to designate corresponding parts throughout.

The device comprises what will subsequently be termed a base frame which supports the knives and potato holders. The base frame is oblong in contour and includes in its construction a pair of side sills 5 and 6, to the opposite ends of which are secured the end sills 7 and 8. The side sills 5 and 6 are on their lower sides provided with inwardly extending flanges 9 and 10, and formed on the inner faces of the side sills 5 and 6 are a plurality of vertical slots which receive the transverse cutting blades 11. The slots for the cutting blades 11 are arranged in close relation so that the cutting blades may be disposed at various distances apart according to the size of the seed required. The cutting blades 11 are on their upper edges provided with transverse slots which receive a blade 12. The blade 12 corresponds in length to the length of the frame, or substantially so, and is designed to cut through the central portion of the potatoes or in other words to halve the same.

Rising from the opposite end portions of the side sills 5 and 6 are a pair of side frames 13 and 14. Each of these members is preferably formed of a single piece of stout steel wire or the like, having portions adjacent its opposite ends bent downwardly as shown at 15, and secured to the upper face of one of the side sills. The supporting frames 13 and 14 may be of any required height and in all cases will be considerably greater in height than the length of the short axis of an ordinary potato.

Secured to the intermediate portion of the end sill 7 and extending in advance of the same is an angular bracket 16, and secured to the outermost end of this bracket is a hook 17. An operating lever is designated by the numeral 18, and at one end is provided with an eye 19, which receives the hook 17. The lever is somewhat greater in length than the length of the base frame and its free end terminates in a handle 20. By virtue of the connection between the lever and hook 17 the lever may be swung to a position between the side frames as clearly shown in Figs. 1, 2, 4 and 5 or may be moved outwardly and beyond the side frames when it is desired to position the potatoes between said side frames.

Rising from the end sill 8 or that opposite to the sill to which the lever is connected are a pair of guides 21 and 22. These members are preferably formed of single pieces of stout steel wire or the like, and are arranged on opposite sides of the horizontal center of the end sill 8. The guides 21 and 22 rise to points above the planes of the side frames 13 and 14 and are thence directed laterally and downward in opposite directions and have their upper ends secured to the opposite end portions of the side frames 13 and 14. The guides are spaced apart sufficiently far to permit the free end portion of the operating lever to freely move therein and positioned between the guides and rising from the end sill 8 is a stud 23. The stud 23 is of less height than the guides and in the path of movement of the operating lever 18 so that when the latter has descended for a certain distance it will come in contact with the upper end of the stud 23, whereby further downward movement of the lever will be prevented until the said lever is forced laterally and thence downwardly between the stud and one of the guides, it being understood that sufficient space will exist between the stud 23 and one of the guides to permit the lever to be so moved.

By reference now to Figs. 2 and 3 a lug 24 will be seen extending laterally from the outer face of the side sill 6 and adjacent that end of the latter to which the operating lever is secured, the upper face of which is in a plane with the upper face of the side sill. What will subsequently be termed a divider or halving knife is designated by the numeral 25. This member is provided with a sharp cutting edge and is considerably greater in length than the width of the base frame. It might here be stated, that the upper edge of the blade 12 extending transverse the blades 11 is in a plane with the upper face of the side sills 5 and 6 of the base frame and the blade 25 bears on the blade 12. Connection between one end of the blade 25 and lug 24 is established by means of a link 26, the opposite ends of which are pivoted to the blade and lug, while the opposite end of the blade terminates in a handle 27. With this construction it is evident that the blade 25 may be moved longitudinally of the base frame for a considerably greater distance than if the blade were pivoted to the lug 24.

From the foregoing it can be seen when a number of potatoes have been placed on the bed of knives in such position that the largest potatoes will be at that end of the base frame adjacent to the end of the base frame to which the operating lever 18 is connected that the said potatoes may be cut into cubes or seed by first bringing the operating lever in position between the side frames and then forcing the said operating lever downwardly. This downward movement of the operating lever will force the knives through the potatoes until the lever bears on the stud 23. When the parts are so positioned the knives at that end of the base frame to which the lever is connected, will be forced approximately half-way through the largest potato. By now moving the blade 25 longitudinally of the frame the said blade will split the potato in the direction of its length, after which the operating lever is forced farther downward until the blades 11 and 12 have been forced completely through all of the potatoes.

In order that the potatoes may be held against movement during the cutting operation a plurality of holders are employed. These members are arranged transversely and longitudinally of the frame and prevent lateral and longitudinal movement of the potatoes. By reference now to Figs. 1 to 5 inclusive it will be seen that extending inwardly from the upper sides of the side frames 13 and 14 are a plurality of arms or supports 28. These members are preferably formed of single pieces of steel wire or the like, the outer terminals of which are wrapped around the upper sides of the side frames while the inner ends of which extend to points on either side of the vertical plane of the blade 12. These arms 28 are spaced apart for unequal distances, the space between the arms adjacent that end of the frame to which the lever is secured being considerably greater than the space between the arms at the opposite end of the frame. The arms of both side frames are in direct alinement with each other and at their inner ends are provided with a pair of resilient leaves or holders 29 and 30. Each pair of leaves or holders consists of a single piece of sheet steel or the like, the intermediate portion of which is rolled so as to provide a substantially tubular opening 31, for the reception of the arm or support 28. The leaves or holders diverge from the opening 31 and extend downwardly to points adjacent the cutting edges of the knives 11 and 12 and are designed to bear on the opposite ends of the potatoes to be cut and prevent the said potatoes from end-wise movement on the knives. Carried by the upper sides of the side frames 13 and 14 are a plurality of keepers 32. These members are preferably formed of single pieces of sheet metal and are arranged between the arms 28. The outer sides of the keepers 32 are provided with knuckles 33, which receive the upper sides of the side frames 13 and 14, while the lower or inner sides of the keepers extend downwardly and to points in a plane with the lower sides of the leaves 29 and 30, or substantially so. The keepers 32 extend downwardly and inwardly from the side frames and are yieldingly held in this position by a plurality of rods 34. Arranged between the down-turned end portions 15 of the side frames are a pair of side plates 36 and 37. These members are fixedly secured to the upper faces of the side sills 5 and 6 and extend upwardly to approximately the middle of the downturned end portions 15. A portion of the lower edges of the side plates 36 and 37, adjacent that end of the frame to which the operating lever is secured are spaced from the upper faces of the side sills in order to provide an opening for the oblong blade of sufficient length to permit the blade 25 to be moved therein. The side plates 36 and 37 are provided adjacent their upper sides with a plurality of spaced openings 38, which receive the free ends of the rods 34, and surrounding the said rods 34 are helical compression springs 39, the opposite terminals of which bear on the inner faces of the side plates and outer faces of the keepers. The springs 39 force the keepers 32 inwardly so that the lower ends of said keepers, will as before stated, lie in a plane with the lower and inner ends of the leaves 29 and 30. The keepers 32 bear on the opposite sides of the potatoes to be cut and hold the said potatoes against lateral movement during the cutting operation.

From the foregoing it can be seen that I have provided a device which is exceedingly simple in structure and comparatively inexpensive to manufacture, embodying few parts and these so arranged that the danger of derangement will be reduced to a minimum.

What is claimed as new, is:—

1. In a seed potato cutter, a base frame, fixed cutters arranged therein, a pair of side frames rising from the opposite sides of the base frame, a plurality of arms extending inwardly from the side frames, leaves secured to said side frames between the arms, inverted V shaped leaves carried by said arms, and coöperating with the first-named leaves to form a series of graduated potato receiving compartments, the legs of each V shaped leaf forming the oppositely inclined end walls of adjacent compartments, a lever pivotally mounted on the base frame and movable in a vertical plane through said compartments whereby a plurality of various sized potatoes are sectioned with one thrust of the lever.

2. In a seed potato cutter, a base frame, fixed cutters arranged therein, a plurality of graduated potato receiving compartments on said base frame having their open bottoms registering with said cutters, a pivoted knife above said fixed cutters movable in a horizontal plane across the open bottom of one of the compartments, this last-named compartment being adapted to receive the largest of the seed potatoes, an operating lever on said base frame movable in a vertical frame through said compartments, said lever having one end loosely mounted on said base frame, a pair of guides at the opposite end of the base frame receiving the free end of the operating lever, a stop positioned between the guides for checking the downward movement of said lever, said operating lever being adapted to be moved laterally from engagement with said stop and its thrust continued whereby to section the potato in the small compartment after the horizontal knife has been actuated to section longitudinally the potato in the large compartment.

In testimony whereof, I affix my signature, in presence of two witnesses.

BYRON PORTER.

Witnesses:
 G. Y. ROBBINS,
 WILLIAM ROBISON.